US011828240B2

(12) United States Patent
Sase et al.

(10) Patent No.: US 11,828,240 B2
(45) Date of Patent: Nov. 28, 2023

(54) OPERATING STATE DETERMINATION DEVICE FOR ENGINE, VEHICLE, OPERATING STATE DETERMINATION METHOD FOR ENGINE

(71) Applicant: MITSUBISHI HEAVY INDUSTRIES ENGINE & TURBOCHARGER, LTD., Sagamihara (JP)

(72) Inventors: Ryo Sase, Tokyo (JP); Shintarou Noguchi, Tokyo (JP); Byeongil An, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/420,615

(22) PCT Filed: Jan. 15, 2019

(86) PCT No.: PCT/JP2019/000924
§ 371 (c)(1),
(2) Date: Jul. 2, 2021

(87) PCT Pub. No.: WO2020/148805
PCT Pub. Date: Jul. 23, 2020

(65) Prior Publication Data
US 2022/0106918 A1 Apr. 7, 2022

(51) Int. Cl.
*F02D 41/04* (2006.01)
*F02D 41/00* (2006.01)
(Continued)

(52) U.S. Cl.
CPC .......... *F02D 41/0007* (2013.01); *F02B 39/16* (2013.01); *F02D 41/009* (2013.01);
(Continued)

(58) Field of Classification Search
CPC ................... F02D 41/22; F02D 41/221; F02D 2200/1015; F02D 41/0007; F02D 41/1498; G01M 15/11
(Continued)

(56) References Cited

U.S. PATENT DOCUMENTS 7,283,923 B2   10/2007 Barila et al.
8,402,953 B2   3/2013 Kawabe et al.
(Continued)

FOREIGN PATENT DOCUMENTS

DE  199 38 037 B4   8/2007
JP  2000-54906 A    2/2000
(Continued)

OTHER PUBLICATIONS

Office Action dated Apr. 19, 2022 issued in counterpart Japanese Application No. 2020-566359 with an English Translation.
(Continued)

*Primary Examiner* — Gonzalo Laguarda
(74) *Attorney, Agent, or Firm* — Birch, Stewart, Kolasch & Birch, LLP

(57) ABSTRACT

A temporal change of a turbo rotation speed of a turbocharger is detected for each cycle of an engine. A first vibration component corresponding to each of cylinders is specified from a pulsation component included in the temporal change of the turbo rotation speed, and the first vibration components for each of the cylinders are integrated over a plurality of cycles. A variation of combustion states in the plurality of cylinders is calculated by comparing integration results among the cylinders.

15 Claims, 8 Drawing Sheets

(51) Int. Cl.
*F02B 39/16* (2006.01)
*F02D 41/22* (2006.01)
*F02D 41/28* (2006.01)

(52) U.S. Cl.
CPC ............. *F02D 41/22* (2013.01); *F02D 41/28* (2013.01); *F02B 2039/168* (2013.01); *F02D 2041/286* (2013.01); *F02D 2200/0406* (2013.01)

(58) Field of Classification Search
USPC ..................... 73/114.02, 114.04; 701/111
See application file for complete search history.

(56) References Cited

U.S. PATENT DOCUMENTS

| | | | |
|---|---|---|---|
| 2001/0039473 | A1 | 11/2001 | Takaku et al. |
| 2007/0016385 | A1* | 1/2007 | Barila ................. G01P 3/44 702/142 |
| 2008/0190184 | A1* | 8/2008 | Walters ................. G01M 15/11 73/114.02 |
| 2010/0250101 | A1* | 9/2010 | Kawabe ............. F02D 41/0007 701/104 |
| 2017/0089315 | A1 | 3/2017 | Fujita |
| 2017/0107924 | A1* | 4/2017 | Blythe ................ F02D 41/0065 |
| 2017/0314482 | A1 | 11/2017 | Nakagawa et al. |
| 2020/0063678 | A1* | 2/2020 | Asai .................... F02D 41/0007 |
| 2020/0165994 | A1* | 5/2020 | Sase ................... F02D 41/0007 |
| 2020/0232408 | A1* | 7/2020 | Sase ...................... F02D 41/009 |
| 2021/0087994 | A1* | 3/2021 | Grasreiner ............. G01M 15/11 |

FOREIGN PATENT DOCUMENTS

| | | |
|---|---|---|
| JP | 2009-127453 A | 6/2009 |
| JP | 2014-231830 A | 12/2014 |
| JP | 6102885 B2 | 3/2017 |
| JP | 2017-66928 A | 4/2017 |
| JP | 2017-82697 A | 5/2017 |
| JP | 2018-84207 A | 5/2018 |
| WO | WO 2016/063639 A1 | 4/2016 |

OTHER PUBLICATIONS

Hasegawa et al., "Individual Cylinder Air-Fuel Ratio Feedback Control Using an Observer," Honda R&D Technical Review, vol. 6, 1994, pp. 72-79, with English abstract.

International Preliminary Report on Patentability and Written Opinion of the International Searching Authority for International Application No. PCT/JP2019/000924, dated Jul. 29, 2021, with English translation of the Written Opinion.

International Search Report for International Application No. PCT/JP2019/000924, dated Apr. 16, 2019.

Suganuma et al., "Advanced Air-Fuel Ratio Sensor for improved detectability of Air-Fuel Ratio imbalance," vol. 19, 2014, pp. 187-193, with English abstract.

German Office Action for corresponding German Application No. 112019006006.6, dated Jun. 19, 2023.

* cited by examiner

FIG. 9

| | | Determination result of second determination part (Evaluation on combustion energy) | |
|---|---|---|---|
| | | Large | Small |
| Determination result of first determination part (Evaluation on exhaust energy) | Lge. | State 1 | State 2 |
| | Sml. | State 3 | State 4 |

OPERATING STATE DETERMINATION DEVICE FOR ENGINE, VEHICLE, OPERATING STATE DETERMINATION METHOD FOR ENGINE

TECHNICAL FIELD

The present disclosure relates to an operating state determination device for an engine mounted with a turbocharger and including a plurality of cylinders, a vehicle including the operating state determination device, and an operating state determination method for the engine.

BACKGROUND

In order to improve performance of an engine, development of electronic control technologies in an Engine Control Unit (ECU) or the like is advanced. In an engine including a plurality of cylinders, as one of such electronic control technologies, grasping a variation in combustion states among the cylinders and determining, based on the variation, presence or absence of an abnormality in engine or performing correction control for suppressing the variation are known. For example, adjusting a fuel injection amount and a fuel injection timing in each cylinder based on the grasped variation, it is possible to compensate for aging degradation and an individual difference between the cylinders. Moreover, controlling such that an air-oil ratio coincides with a target air-oil ratio not only in the entire engine but also in each cylinder, it is also possible to uniform the combustion states among the cylinders.

As a method for grasping the variation in combustion states among the cylinders, installing an in-cylinder pressure sensor in each cylinder or installing an oxygen sensor in an exhaust passage of each cylinder is considered. However, in the above method, it is necessary to increase the number of sensors to be installed in accordance with the number of cylinders, increasing a cost. Thus, Patent Document 1 proposes evaluating a variation in combustion states among cylinders based on a temporal change of an engine rotation speed that can be detected by an existing sensor without increasing the number of sensors to be installed.

In Patent Document 1, associating a pulsation component included in the engine rotation speed with a crank angle, vibration components by the respective cylinders are specified to grasp the variation of the combustion states among the cylinders. Moreover, in the document, since a random element is included at a certain operation point as well in a combustion state of the engine, the random element is eliminated by integration over a predetermined cycle to evaluate the variation of the combustion states in the respective cylinders.

CITATION LIST

Patent Literature

Patent Document 1: JP2017-82697A

SUMMARY

Technical Problem

In Patent Document 1 described above, the variation among the cylinders is grasped based on the variation of the engine rotation speed. However, since a crank shaft and the like, where the engine rotation speed is detected, are coupled to an axle side, the engine rotation speed includes, to no small extent, an influence by a disturbance factor on the axle side (for example, a road surface). Thus, the disturbance factor increases depending on a running condition of a vehicle, which may make it difficult to accurately grasp the variation among the cylinders.

At least one embodiment of the present invention was made in view of the above issue, and an object of the present invention is to provide an operating state determination device for the engine capable of properly determining an operating state of the engine by accurately evaluating the variation among the cylinders, a vehicle, and an operating state determination method for the engine.

Solution to Problem (1) In order to solve the above-described problems, an operating state determination device for an engine according to at least one embodiment of the present invention is an operating state determination device for an engine mounted with a turbocharger and including a plurality of cylinders, which includes a turbo rotation speed detection part for detecting a temporal change of a turbo rotation speed of the turbocharger, for each cycle of the engine, a first vibration component specification part for specifying a first vibration component corresponding to each of the cylinders from a pulsation component included in the temporal change of the turbo rotation speed, a first integration part for integrating the first vibration components for each of the cylinders over a plurality of cycles of the engine, and a first variation calculation part for calculating a variation of combustion states in the plurality of cylinders by comparing integration results of the first integration part among the cylinders.

With the above configuration (1), the first vibration component corresponding to each of the cylinders is specified based on the pulsation component included in the temporal change of the turbo rotation speed of the turbocharger. The first vibration components corresponding to each of the cylinders are integrated over the plurality of cycles, thereby eliminating a random element associated with an engine operation. Comparing the thus obtained integration results among the cylinders, it is possible to obtain the variation of the combustion states in the plurality of cylinders. The turbocharger is driven by exhaust energy, is not coupled to an axle side, and thus unlike an engine rotation speed, does not receive any influence from the axle side. Thus, the variation calculated based on the temporal change of the turbo rotation speed does not include a disturbance factor from the axle side, making it possible to obtain good accuracy.

(2) In some embodiments, in the above configuration (1), the first integration part integrates the first vibration components on which a normalization process regarding an operating state of the engine is performed.

The pulsation component included in the temporal change of the turbo rotation speed changes depending on the operating state of the engine. With the above configuration (2), integrating the first vibration components on which the normalization process regarding the operating state of the engine is performed, pulsation components, which are detected in different operating states of the engine and included in the temporal change of the turbo rotation speed, are equally treated, making it possible to simply but accurately calculate the variation.

(3) In some embodiments, in the above configuration (1) or (2), if the pulsation component has an amplitude of not greater than a predetermined value, a process is prohibited.

If the amplitude of the pulsation component included in the temporal change of the turbo rotation speed is not greater than the predetermined value, a noise component is relatively large. Thus, in the above configuration (3), the process is prohibited under such condition where the noise component is relatively large, making it possible to prevent a decrease in determination accuracy.

(4) In some embodiments, in any one of the above configurations (1) to (3), the first vibration component specification part associates the first vibration component included in the temporal change of the turbo rotation speed with each of the cylinders, based on a reference signal synchronized with a rotation state of a crank shaft.

With the above configuration (4), obtaining the reference signal synchronized with the rotation state of the crank shaft in the internal combustion engine, it is possible to properly identify the first vibration component corresponding to each of the cylinders from the pulsation component included in the temporal change of the turbo rotation speed.

(5) In some embodiments, in any one of the above configurations (1) to (4), the operating state determination device for the engine includes a first determination part for determining presence or absence of an abnormality in the engine based on a calculation result of the first variation calculation part.

With the above configuration (5), it is possible to properly determine the abnormality in the engine based on the variation of the combustion states in the respective cylinders.

(6) In some embodiments, in the above configuration (5), the first variation calculation part calculates, as the variation, a variance value regarding the integration results of the first vibration components corresponding to the respective cylinders, and the first determination part determines that the engine has the abnormality, if the variance value is not less than a first threshold.

With the above configuration (6), the variance value is obtained as the variation of the combustion states in the respective cylinders. Then, if it is judged based on the variance value that the variation is large, it is possible to determine that the engine has the abnormality.

(7) In some embodiments, in the above configuration (5) or (6), the first variation calculation part calculates, as the variation, a difference from an average value of the integration results of the first vibration components corresponding to the respective cylinders, and the first determination part determines that there is the abnormality in the cylinders having the difference of not less than a second threshold.

With the above configuration (7), the difference from the average value of the integration results of the respective cylinders is obtained as the variation of the combustion states in the respective cylinders. Then, it is possible to determine that there is the abnormality in the cylinders which is judged, based on the difference, that the variation is large.

(8) In some embodiments, in any one of the above configurations (5) to (7), the operating state determination device for the engine further includes a correction control instruction part for instructing to perform correction control on an operation parameter of the engine, if the first determination part determines that the engine has the abnormality. If the correction control is performed not less than a predetermined number of times, the first determination part determines that the engine has the abnormality, regardless of the calculation result of the first variation calculation part.

With the above configuration (8), if the engine has the abnormality, attempt at improvement is made by performing the correction control on the operation parameter of the engine. In this case, the number of executions of the correction control is counted, if the number of counts reaches not less than a predetermined number of times, the internal combustion engine is likely to have some defect, and abnormality determination is performed regardless of the variation calculation result.

(9) In some embodiments, in the above configuration (1), the operating state determination device for the engine further includes a rank specification part for specifying a rank of the first vibration component for each of the cylinders included in the temporal change of the turbo rotation speed, for each cycle of the engine. The first integration part integrates the ranks for each of the cylinders over the plurality of cycles of the engine.

With the above configuration (9), the first vibration components corresponding to the respective cylinders, which are obtained by analyzing the pulsation component included in the temporal change of the turbo rotation speed, are compared with each other, thereby performing ranking among the cylinders. Such ranking is repeated over the plurality of cycles, and the ranks are integrated for each of the cylinders. Then, the variation of the combustion states among the cylinders may be grasped by comparing the integration results of the ranks of each of the cylinders.

(10) In some embodiments, in the above configuration (9), an average value of the ranks for each of the cylinders is calculated, and based on whether the average value of each of the cylinders falls within a predetermined range, presence or absence of an abnormality in the engine is determined.

With the above configuration (10), if the average value of the ranks for each of the cylinders varies over the predetermined range, it is possible to determine that the engine has the abnormality.

(11) In some embodiments, in any one of the above configurations (1) to (10), the operating state determination device for the engine further includes an engine rotation speed detection part for detecting a temporal change of an engine rotation speed of the engine, for each cycle of the engine, a second vibration component specification part for specifying a second vibration component corresponding to each of the cylinders from a pulsation component included in the temporal change of the engine rotation speed, a second integration part for integrating the second vibration components for each of the cylinders over the plurality of cycles of the engine, a second variation calculation part for calculating a variation of combustion states in the plurality of cylinders by comparing integration results of the second integration part among the cylinders, and a third determination part for determining an operating state of the engine based on a calculation result of the first variation calculation part and a calculation result of the second variation calculation part.

With the above configuration (11), in addition to variation calculation based on the temporal change of the turbo rotation speed described above, variation calculation based on the temporal change of the engine rotation speed is also performed in the same manner. Thus calculating the variation by two kinds of methods based on the turbo rotation speed and the engine rotation speed, it is possible to determine the operating state of the engine in more detail.

(12) In order to solve the above-described problems, a vehicle according to at least one embodiment of the present invention includes the operating state determination device according to any one of the above configurations (1) to (11), and a vehicle control unit for controlling the engine based on a determination result of the operating state determination device.

With the above configuration (12), the above-described operating state determination device (including the various aspects described above) is configured as an element independent of the vehicle control unit for controlling the engine. Determination control of the operating state is performed by the operating state determination device, and the determination result is sent to the vehicle control unit to be used for various kinds of vehicle control. Thus processing control regarding operating state determination by the dedicated unit, it is possible to effectively reduce a processing burden in the vehicle control unit.

(13) In order to solve the above-described problems, an operating state determination method for an internal combustion engine according to at least one embodiment of the present invention is an operating state determination method for an engine mounted with a turbocharger and including a plurality of cylinders, which includes a step of detecting a temporal change of a turbo rotation speed of the turbocharger, for each cycle of the engine, a step of specifying a first vibration component corresponding to each of the cylinders from a pulsation component included in the temporal change of the turbo rotation speed, a step of integrating the first vibration components for each of the cylinders over a plurality of cycles of the engine, and a step of calculating a variation of combustion states in the plurality of cylinders by comparing integration results of the first vibration components among the cylinders.

With the above configuration (13), the first vibration component corresponding to each of the cylinders is specified based on the pulsation component included in the temporal change of the turbo rotation speed of the turbocharger. The first vibration components corresponding to each of the cylinders are integrated over the plurality of cycles, thereby eliminating a random element associated with an engine operation. Comparing the thus obtained integration results among the cylinders, it is possible to obtain the variation of the combustion states in the plurality of cylinders. The turbocharger is driven by exhaust energy, is not coupled to an axle side, and thus unlike an engine rotation speed, does not receive any influence from the axle side. Thus, the variation calculated based on the temporal change of the turbo rotation speed does not include a disturbance factor from the axle side, making it possible to obtain good accuracy.

Advantageous Effects

At least one embodiment of the present invention was made in view of the above issue, and it is possible to provide an operating state determination device for an engine capable of properly determining an operating state of the engine by accurately evaluating a variation among cylinders, a vehicle, and an operating state determination method for the engine.

BRIEF DESCRIPTION OF DRAWINGS

FIG. 9 is a table showing a determination example by a third determination part of FIG. 8.

DETAILED DESCRIPTION

Embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention unless particularly specified.

Figure 1:
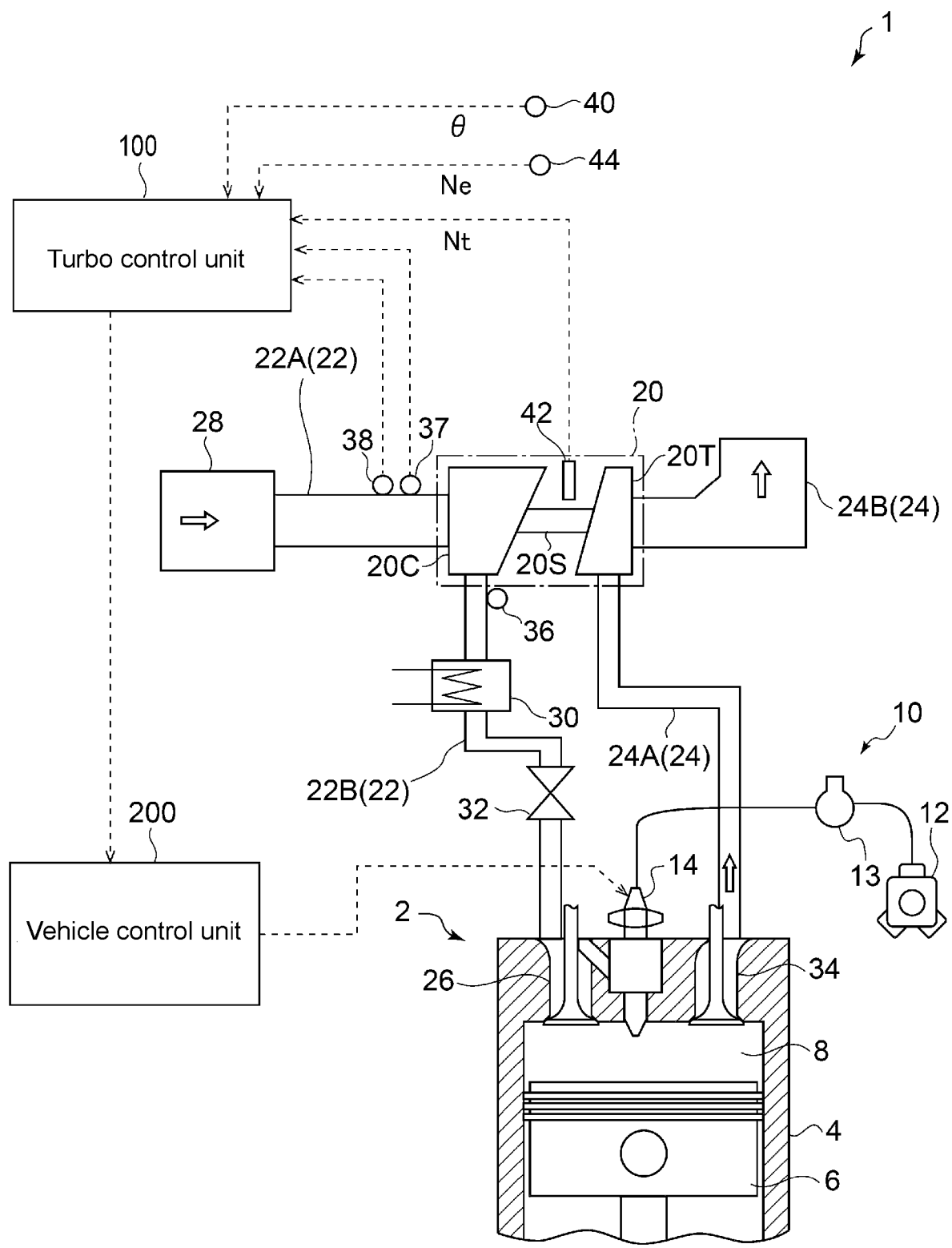
FIG. 1 is a schematic configuration diagram of an engine including an operating state determination device according to at least one embodiment of the present invention.

FIG. 1 is a schematic configuration diagram of an engine 1 including an operating state determination device according to at least one embodiment of the present invention. The engine 1 is a four-cylinder engine and in order to comprehensively illustrate the configuration, FIG. 1 representatively shows only one cylinder of the four cylinders. The engine 1 is a diesel engine mounted on a vehicle, for instance, and includes a combustion chamber 8 defined by a cylinder 4 and an upper surface of a piston 6 in an engine body 2. Fuel is supplied to the combustion chamber 8 by a common rail system 10 (CRS). In the common rail system 10, fuel stored in a fuel tank (not shown) is stored in a common rail 13 at high pressure with a high-pressure pump 12, and the high-pressure fuel stored in the common rail 13 is injected from an injector 14, thereby supplying the fuel to the combustion chamber 8.

The engine 1 may be a gasoline engine. Moreover, the engine 1 is applicable to various fields, such as automobile, truck, bus, ship, industrial engine, and the like.

The engine 1 includes a turbocharger 20. The turbocharger 20 includes a turbine 20T rotated by an exhaust gas discharged from the combustion chamber 8 of the engine body2, and a compressor 20C rotary driven by the turbine 20T. More specifically, the compressor 20C installed in an intake passage 22 of the engine 1 and the turbine 20T installed in an exhaust passage 24 of the engine 1 are coupled via a rotational shaft 20S. Then, as the exhaust gas discharged from the combustion chamber 8 of the engine body 2 rotates the turbine 20T when flowing outward through the exhaust passage 24, the compressor 20C coupled coaxially to the turbine 20T rotates, and intake air flowing through the intake passage 22 is compressed.

The intake passage 22 is formed by an upstream intake passage 22A and a downstream intake passage 22B. The upstream intake passage 22A causes an intake duct (not shown) serving as an intake port for intake air and an inlet (intake air inflow port) of the compressor 20C to communicate with each other. The downstream intake passage 22B causes the outlet (intake air discharge port) of the compressor 20C and an intake port 26 of the engine body 2 to communicate with each other. That is, air (intake air) taken in from the intake air duct (not shown) flows through the intake passage 22 in the order of the upstream intake passage 22A and the downstream intake passage 22B toward the combustion chamber 8 of the engine body 2. When flowing through the upstream intake passage 22A, intake air has foreign substances, such as dust and dirt included therein, removed by passing through an air cleaner 28 disposed in the upstream intake passage 22A, and then compressed when passing through the compressor 20C from the inlet to the outlet. Moreover, when flowing through the downstream intake passage 22B toward the combustion chamber 8, the intake air compressed by the compressor 20C passes through an inter cooler 30 for increasing the intake air density by cooling and a throttle valve 32, which are disposed in the downstream intake passage 22B, in this order and enters the combustion chamber 8.

The exhaust passage 24 is formed by an upstream exhaust passage 24A and a downstream exhaust passage 24B. The upstream exhaust passage 24A causes an exhaust port 34 of the engine body 2 and an inlet (exhaust flow inlet) of the turbine 20T to communicate with each other. The downstream exhaust passage 24B causes the outlet (exhaust discharge port) of the turbine 20T and the outside to communicate with each other. An exhaust gas (combustion gas) generated by combustion in the combustion chamber 8 flows outward through the exhaust passage 24 in the order of the upstream exhaust passage 24A and the downstream exhaust passage 24B. The exhaust gas having passed through the upstream exhaust passage 24A of the exhaust passage 24 rotates the turbine 20T when passing through the turbine 20T from the inlet to the outlet. Subsequently, the exhaust gas flows outward through the downstream exhaust passage 24B.

The turbocharger 20 is, for example, a VG (Variable Geometry) turbocharger and has a variable nozzle mechanism (not shown) capable of adjusting the flow rate of the exhaust gas flowing into a turbine rotor blade. The variable nozzle mechanism adjusts a nozzle opening degree in accordance with the operating state of the engine 1 and adjusts an exhaust gas pressure toward the turbine rotor blade, thereby controlling a boost pressure to an optimum condition. More specifically, as well known, the nozzle opening degree is reduced to increase the exhaust gas pressure during a low-speed rotation of the engine 1, and on the contrary, the nozzle opening degree is increased during a high-speed rotation of the engine 1.

The turbocharger 20 may be a turbocharger with a wastegate valve including a wastegate valve (not shown).

In order to detect the boost pressure by the compressor 20C, a boost pressure sensor 36 is installed in the downstream intake passage 22B. In addition, an inlet pressure sensor 37 capable of detecting the pressure (inlet pressure) at the inlet of the compressor 20C and an intake amount sensor 38 capable of detecting the amount of intake air flowing into the compressor 20C are installed in the upstream intake passage 22A.

A cycle of each cylinder of the engine 1 is configured to be detectable from a detected value by a crank angle sensor 40 capable of detecting a crank angle θ of the engine 1.

Moreover, the turbocharger 20 includes a turbo rotation speed sensor 42 for detecting a turbo rotation speed Nt of the turbocharger 20. In the turbo rotation speed sensor 42, the turbo rotation speed Nt is continuously detected in time series, thereby detecting a temporal change of the turbo rotation speed Nt. Moreover, the engine 1 includes an engine rotation speed sensor 44 for detecting an engine rotation speed Ne. In the engine rotation speed sensor 44, the engine rotation speed Ne is continuously detected in time series, thereby detecting a temporal change of the engine rotation speed Ne.

The engine 1 having the above configuration includes, as a control unit, a turbo control unit 100 and an engine control unit 200. The turbo control unit 100 is a dedicated unit for performing various kinds of control on the turbocharger 20, and, for example, adjusts the nozzle opening degree in accordance with the operating state of the engine 1 and adjusts the exhaust gas pressure toward the turbine rotor blade, thereby controlling a boost pressure to the optimum condition. The operating state of the engine 1 is configured to be identifiable by detecting an operation point of the compressor 20C by the intake amount and a pressure ratio (outlet pressure/inlet pressure) of the inlet pressure to the outlet pressure, based on respective detected values by the boost pressure sensor 36, the inlet pressure sensor 37, and the intake amount sensor 38, for example.

The turbo control unit 100 is configured independently of the engine control unit 200 serving as a main control unit for the engine 1. The turbo control unit 100 is configured to function as the operating state determination device according to at least one embodiment of the present invention and is constituted by, for example, an electronic computation device where programs for performing the operating state determination method according to at least one embodiment of the present invention are installed. In this case, the programs may be stored in a predetermined storage medium and are installed by being read with a reader mounted on the electronic computation device. Moreover, the programs for performing the operating state determination method according to at least one embodiment of the present invention and the storage medium where the programs are stored also fall within the scope of the claimed invention.

The engine control unit 200 is the main control unit for the engine 1, and controls the operating state of the engine 1 by, for example, performing combustion control of controlling a fuel injection amount and a fuel injection timing from the injector 14. Such combustion control is performed based on, for example, an operation amount of an accelerator pedal detected by an accelerator position sensor (not shown), the running condition of the vehicle, and an operating state of the turbocharger 20 acquired from the turbo control unit 100 and, as will be described later, is configured to be able to perform, based on information regarding a variation among the cylinders obtained from the turbo control unit 100, correction control and the like as well for suppressing the variation.

Figure 2:
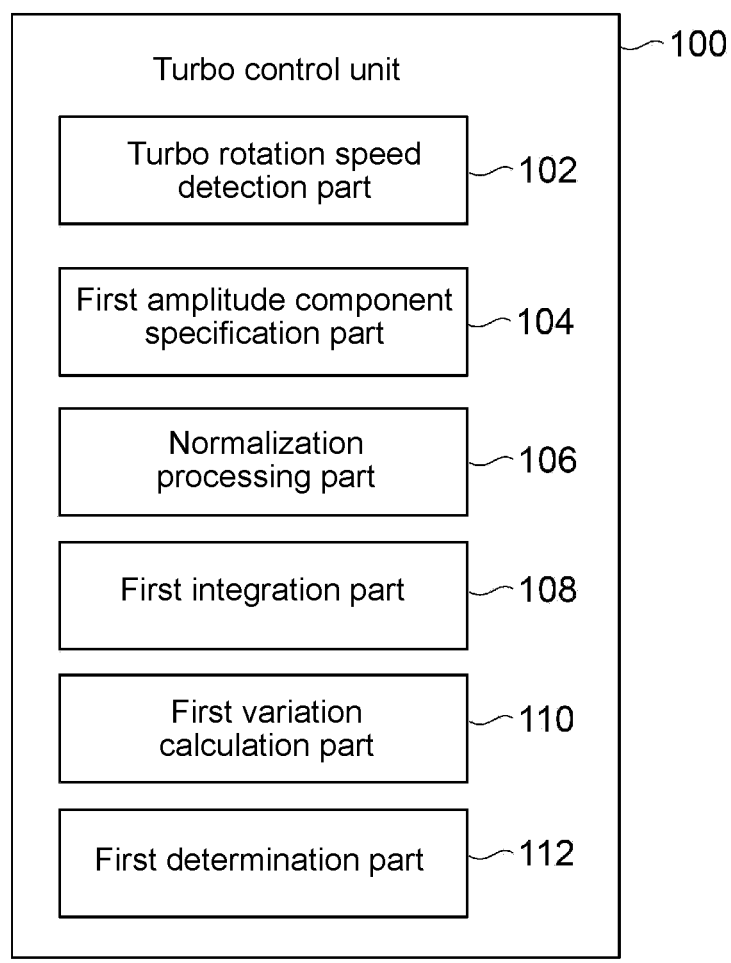
FIG. 2 is a functional block diagram of a turbo control unit in FIG. 1.
Figure 3:
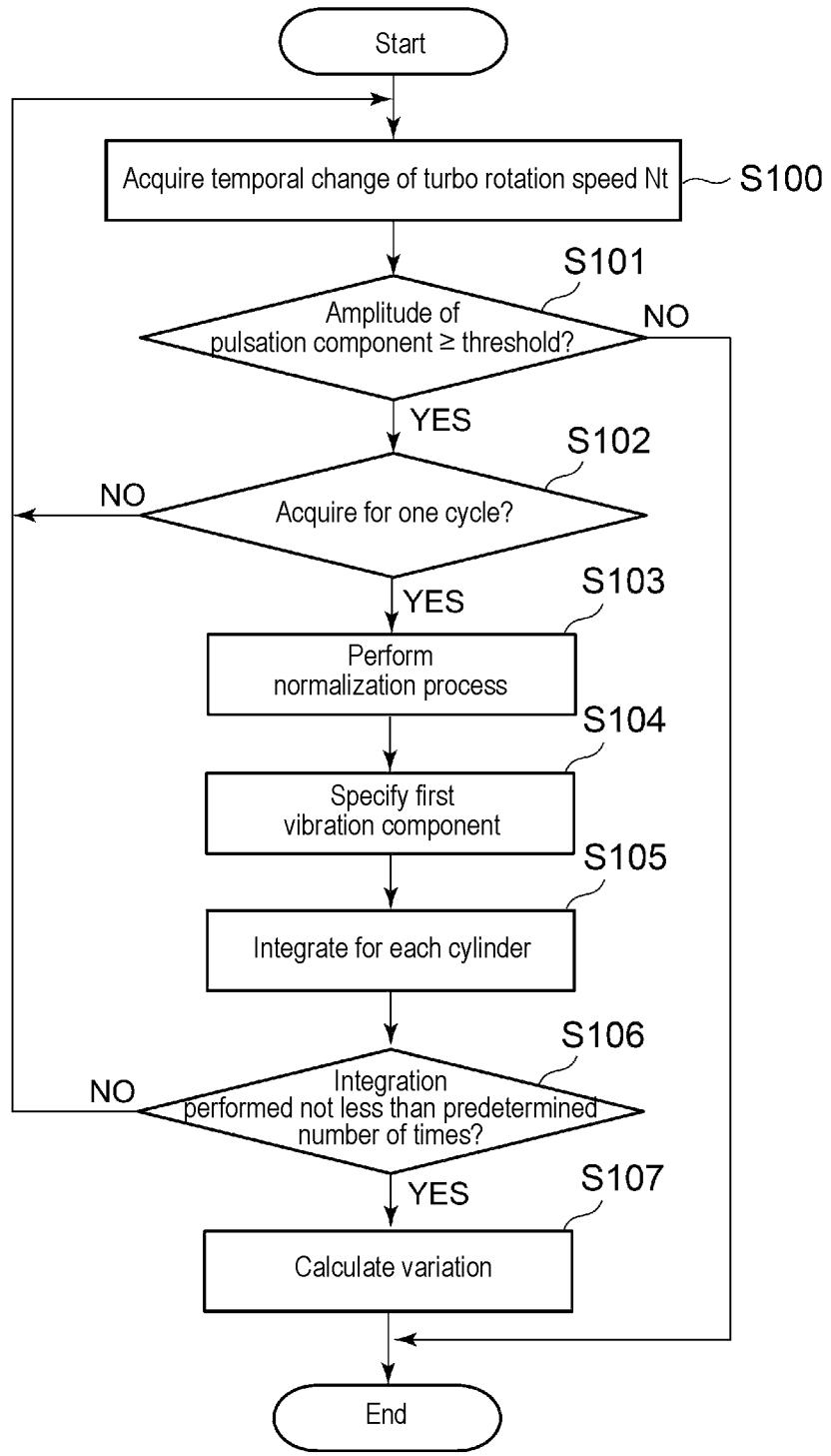
FIG. 3 is a flowchart showing steps of an operating state determination method performed by the turbo control unit of FIG. 2.

FIG. 2 is a functional block diagram of the turbo control unit 100 in FIG. 1, and FIG. 3 is a flowchart showing steps of the operating state determination method performed by the turbo control unit 100 of FIG. 2.

The turbo control unit 100 includes a turbo rotation speed detection part 102, a first vibration component specification part 104, a normalization processing part 106, a first integration part 108, a first variation calculation part 110, and a first determination part 112, as shown in FIG. 2. These functional blocks are exemplary division of the internal configuration of a turbocharger control unit for comprehensively describing the operating state determination method. Thus, the respective functional blocks may be integrated as needed or may further be subdivided.

Figure 4:
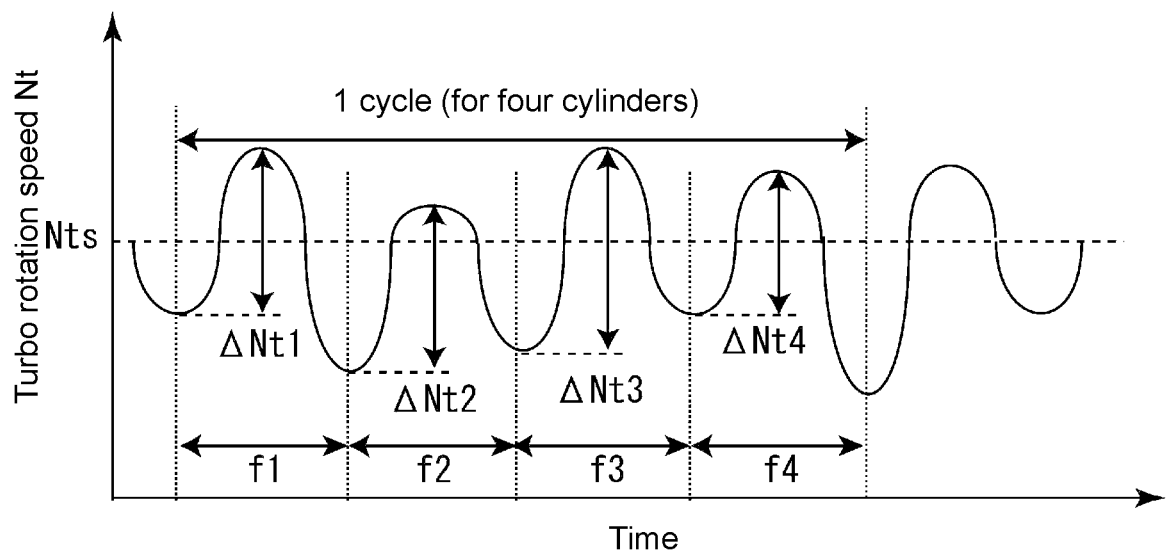
FIG. 4 is a chart showing an example of a temporal change of a turbo rotation speed acquired by a turbo rotation speed sensor of FIG. 2.

In performing the operating state determination method, first, the turbo control unit 100 acquires the turbo rotation speed Nt from the turbo rotation speed sensor 42 continuously in time (step S100). FIG. 4 is a chart showing an example of the temporal change of the turbo rotation speed Nt acquired by the turbo rotation speed sensor 42 of FIG. 2. As shown in FIG. 4, the turbo rotation speed Nt includes a time-varying pulsation component in the vicinity of a representative value Nts corresponding to the operating state of the engine 1. The pulsation component has a frequency corresponding to the number of cylinders of the engine 1. Since the engine 1 of the present embodiment is the four-cylinder engine, four first vibration components f1, f2, f3, f4 corresponding to the respective cylinders appear in one cycle.

The turbo control unit 100 specifies an amplitude of the pulsation component which is included in the temporal change of the turbo rotation speed Nt acquired in step S100 and determines whether the amplitude is not less than a threshold (step S101). If the amplitude of the pulsation component is less than the threshold (step S101: NO), the turbo control unit 100 prohibits performing of the subsequent steps and terminates the process. This is to prevent a decrease in determination accuracy, because a noise component is relatively large if the amplitude of the pulsation component included in the turbo rotation speed Nt is small. On the other hand, if the amplitude of the pulsation component is not less than the threshold (step S101: YES), the noise component included in the pulsation component is relatively small, and thus the subsequent process is performed.

The amplitude of the pulsation component is specified as, for example, a difference between a maximum value and a minimum value adjacent to each other of the pulsation component included in one cycle.

Subsequently, the turbo rotation speed detection part 102 determines whether the temporal change of the turbo rotation speed Nt is acquired for one cycle of the engine 1 (step S102). More specifically, monitoring the temporal change of the turbo rotation speed Nt, the turbo rotation speed detection part 102 determines whether the temporal change for one cycle is acquired based on whether a waveform corresponding to the number of cylinders of the engine 1 appears in the temporal change of the turbo rotation speed Nt. In the present embodiment, since the engine 1 is the four-cylinder engine, completion of the acquirement for one cycle is determined if four waveforms (first vibration components f1, f2, f3, f4) are confirmed in the temporal change of the turbo rotation speed Nt (step S102: YES). On the other hand, if just less than four waveforms are confirmed in the temporal change of the turbo rotation speed Nt (step S102: NO), completion of the acquirement for one cycle is not determined, returning the process to step S100.

Subsequently, the normalization processing part 106 performs a normalization process on the temporal change of the turbo rotation speed Nt for one cycle acquired in step S102 (step S103). The size of the pulsation component included in the temporal change of the turbo rotation speed Nt depends on the operation point of the engine 1. Thus, step S103 performs the normalization process for equally treating pulsation components acquired at different operation points, respectively.

In the present embodiment, as an example of the normalization process, the following equation is used:

$$\Delta Nt_{normalized} = (\Delta Nt - \Delta Nt_{min})/(\Delta Nt_{max} - \Delta Nt_{min})$$

Where $\Delta Nt$ is an amplitude of each of the first vibration components f1, f2, f3, f4 included in the temporal change of the turbo rotation speed Nt (FIG. 4 shows the amplitude $\Delta Nt$ corresponding to the first vibration components f1, f2, f3, f4 by $\Delta Nt1$, $\Delta Nt2$, $\Delta Nt3$, $\Delta Nt4$, respectively), $\Delta Nt_{min}$ is a minimum amplitude of the amplitudes of the first vibration components f1, f2, f3, f4, and $\Delta Nt_{max}$ is a maximum amplitude of the amplitudes of the first vibration components f1, f2, f3, f4.

As shown in FIG. 4, the amplitude $\Delta Nt$ is specified based on a temporally increasing region of the temporal change of the turbo rotation speed Nt (that is, defined as an amplitude difference between the minimum value and the maximum value of the pulsation component, the maximum value being temporally delayed from the minimum value and being the earliest). This is because a behavior in which the turbocharger 20 is driven by exhaust energy is directly related to the increasing region of the turbo rotation speed Nt.

Subsequently, the first vibration component specification part 104 specifies the vibration components f1, f2, f3, f4 corresponding to the respective cylinders from the temporal change of the turbo rotation speed Nt on which the normalization process is performed. As shown in FIG. 4, the temporal change of the turbo rotation speed Nt for one cycle includes the vibration components f1, f2, f3, f4 corresponding to the respective cylinders. That is, the four waveforms included in the temporal change of the turbo rotation speed Nt for one cycle, respectively, correspond to the first vibration component f1 corresponding to the first cylinder, the second vibration component f2 corresponding to the second cylinder, the third vibration component f3 corresponding to the third cylinder, and the fourth vibration component f4 corresponding to the fourth cylinder.

The first vibration component specification part 104 acquires, as a reference signal synchronized with a rotation state of a crank shaft from the engine 1, crank angle information from the crank angle sensor 40. Associating the thus acquired reference signal with the temporal change of the turbo rotation speed Nt for one cycle, the cylinders to which vibration components included in the pulsation component correspond, respectively, are specified.

Figure 5:
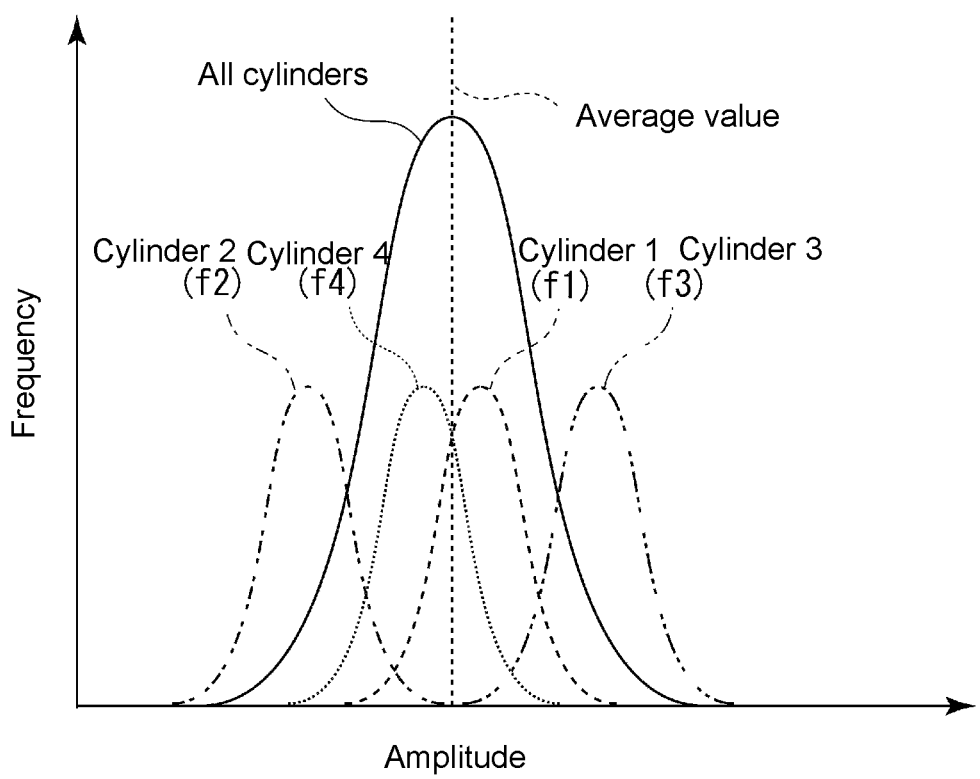
FIG. 5 is a chart showing an example of an integration result in a first integration part of FIG. 2.

Subsequently, the first integration part 108 integrates the vibration component f1, f2, f3, f4 of each cylinder specified in step S104 for each cylinder over a plurality of cycles of the engine 1 (step S105). FIG. 5 is a chart showing an example of an integration result in the first integration part 108 of FIG. 2. In FIG. 5, the distribution of the vibration component f1, f2, f3, f4 of each cylinder is shown as a histogram. In the integration result, a random element associated with an engine operation is eliminated, obtaining a distribution corresponding to the variation of the combustion states in the respective cylinders.

Subsequently, it is determined whether the integration processing in step S105 is performed a predetermined number of times (step S106). The predetermined number of times for the integration processing may be optional. However, the random element associated with the engine operation is likely to remain if the number of integration processing performed is small, whereas a computation load increases as well as real-time processing becomes difficult if the number of integration processing performed is too large. Thus, the predetermined number of times for the integration processing is preferably set in view of these elements. FIG. 5 shows the distribution of each cylinder in the form of Gaussian distribution by performing the integration processing the sufficiently large number of times.

Subsequently, the first variation calculation part 110 calculates the variation of the combustion states in the plurality of cylinders by comparing the integration results of the first vibration components f1, f2, f3, f4 among the plurality of cylinders (step S107). The vibration in the respective cylinders may be, for example, obtained as a difference between the integration results of the first vibration components f1, f2, f3, f4 of the respective cylinders and an average value of the integration results (see FIG. 5) or may be obtained as a variance value of the integration results of the vibration components of the respective cylinders.

In the aforementioned embodiment, as shown in FIG. 5, the variation among the cylinders is determined by integrating the first vibration components f1, f2, f3, f4, which are specified from the pulsation component and correspond to the respective cylinders, and comparing the integration results. However, the variation among the cylinders may be determined based on a result of integrating ranks obtained by comparing and ranking the first vibration components f1, f2, f3, f4, which are specified from the pulsation component and correspond to the respective cylinders, in each cycle.

Figure 6:
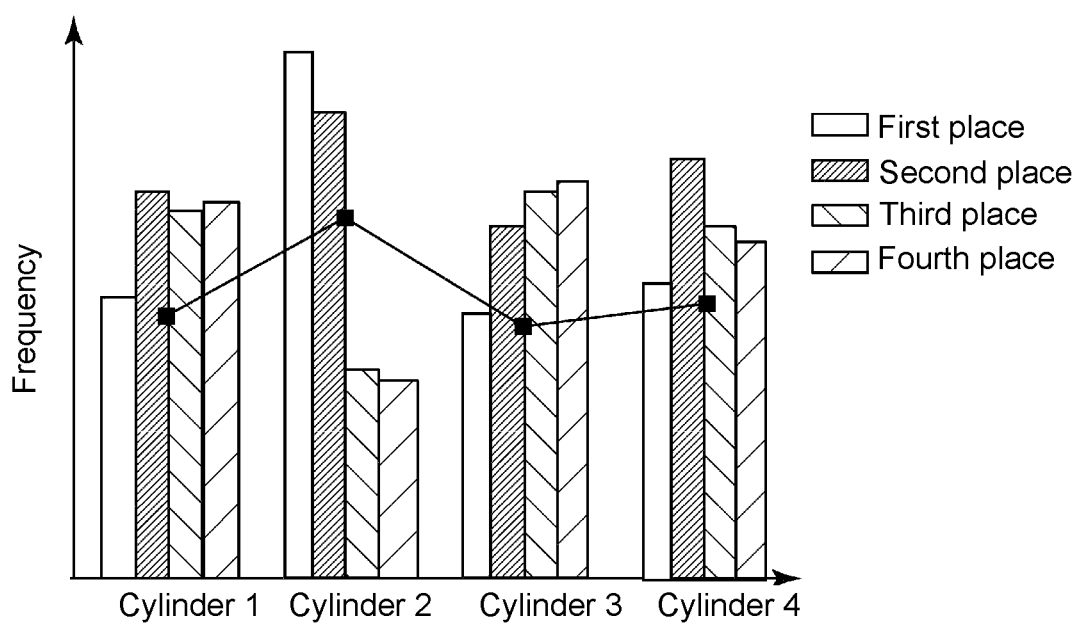
FIG. 6 is a histogram showing a result of integrating ranks obtained by comparing and ranking amplitudes corresponding to respective cylinders in each cycle.

FIG. 6 is a histogram showing a result of integrating ranks obtained by comparing and ranking amplitudes corresponding to the respective cylinders in each cycle. In FIG. 6, comparing the four first amplitude components f1, f2, f3, f4 included in each cycle, the respective cylinders are ranked in order of size of the amplitude. That is, the cylinders are assigned the first place, the second place, the third place, and the fourth place, respectively, in descending order of size of the amplitude in one cycle. Such ranking is performed over the plurality of cycles to aggregate the ranks in each cylinder, obtaining the histogram shown in FIG. 6. In this case, for each cylinder, an average rank is calculated from the integration value of the ranks and based on whether the average rank of each cylinder falls within a reference range, it is possible to evaluate the variation among the cylinders.

Thus, in the first variation calculation part 110, it is possible to obtain the variation of the combustion states in the plurality of cylinders by comparing the integration results of the first vibration components f1, f2, f3, f4, which are included in the pulsation component included in the temporal change of the turbo rotation speed Nt and correspond to the respective cylinders. The turbocharger 20 is driven by the exhaust energy, is not coupled to an axle side, and thus unlike the engine rotation speed Ne, does not receive any influence from the axle side. Thus, the variation calculated based on the temporal change of the turbo rotation speed Nt does not include a disturbance factor from the axle side, making it possible to obtain good accuracy.

Figure 7:
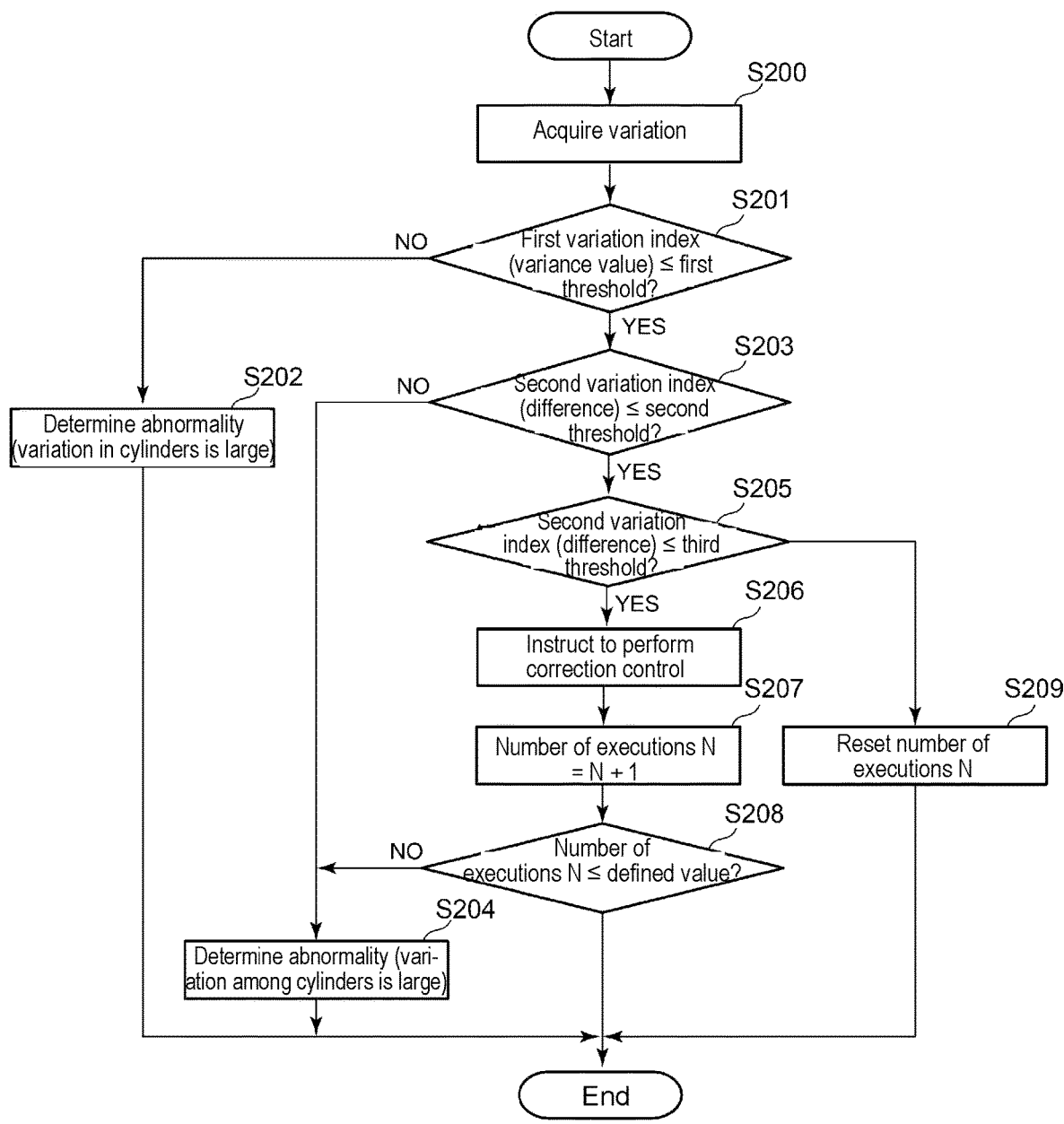
FIG. 7 is a flowchart showing steps of an abnormality determination method for the engine by using a variation of combustion states in the respective cylinders.

Next, an abnormality determination method for the engine 1 based on the variation of the combustion states in the respective cylinders calculated as described above will be described. FIG. 7 is a flowchart showing steps of the abnormality determination method for the engine 1 by using the variation of the combustion states in the respective cylinders.

First, the first determination part 112 acquires, from the first variation calculation part 110, the information regarding the variation of the combustion states in the respective cylinders (step S200). The information acquired here is the calculation result in step S107 described above. As an example thereof, acquired here are a first variation index obtained as the variance value of the integration results of the vibration components of the respective cylinders, and a second variation index obtained as the difference between the integration results of the vibration components of the respective cylinders and the average value of the integration results.

Subsequently, the first determination part 112 determines presence or absence of an abnormality based on the first variation index (the variance value of the integration results of the first vibration components f1, f2, f3, f4 of the respective cylinders) of the variation of the combustion states in the respective cylinders acquired in step S200 (step S201). More specifically, the first determination part 112 determines presence or absence of the abnormality based on whether the first variation index is not greater than a first threshold which is a threshold for abnormality determination. As a result, if the first variation index is greater than the first threshold (step S201: NO), since the variation in the cylinders is large, the first determination part 112 determines that the engine 1 has the abnormality (step S202).

On the other hand, if the first variation index is not greater than the first threshold (step S201: YES), the first determination part 112 determines presence or absence of the abnormality further based on the second variation index (the difference between the integration results of the first vibration components f1, f2, f3, f4 of the respective cylinders and the average value of the integration results) (step S203). More specifically, the first determination part 112 determines presence or absence of a failure based on whether the second variation index is not greater than a second threshold which is a threshold for abnormality determination. As a result, if the second variation index is greater than the second threshold (step S203: NO), since the variation among the cylinders is large, the first determination part 112 determines that the engine 1 has the failure (step S204).

On the other hand, if the second variation index is not greater than the second threshold (step S203: YES), further comparing the second variation index with a third threshold which is a threshold for correction control, it is determined whether to perform correction control on the internal combustion engine in order to suppress the variation (step S205). The third threshold is typically set smaller than the second threshold. The correction control is control for reducing the variation of the combustion states in the respective cylinders acquired in step S200 by, for example, adjusting the fuel injection timing and the fuel injection amount, and is performed by giving an instruction from the turbo control unit 100 to the engine control unit 200.

If the second variation index is not less than the third threshold (step S205: YES), the engine control unit 200 is instructed to perform the correction control (step S206), and the number of executions N of the correction control is added (step S207). Then, it is determined whether the number of executions N of the correction control after the addition is not greater than a defined value (step S208). If the number of executions N of the correction control is greater than the defined value (step S208: NO), the first determination part 112 determines that the engine 1 has the abnormality (step S204). This is because even if the variation of the combustion states is relatively small, the possibility that the engine 1 has the abnormality increases in the case where the number of executions of the correction control is large.

On the other hand, if the number of executions N of the correction control is not greater than the defined value (step S208: YES), the turbo control unit 100 terminates the process. Moreover, if the second variation index is smaller than the third threshold (step S205: NO), the number of executions N is reset (step S209), and the turbo control unit 100 also terminates the process.

Thus, in the first determination part 112, it is possible to properly determine the abnormality in the engine based on the variation of the combustion states in the respective cylinders which is the calculation result of the first variation calculation part 110.

Figure 8:
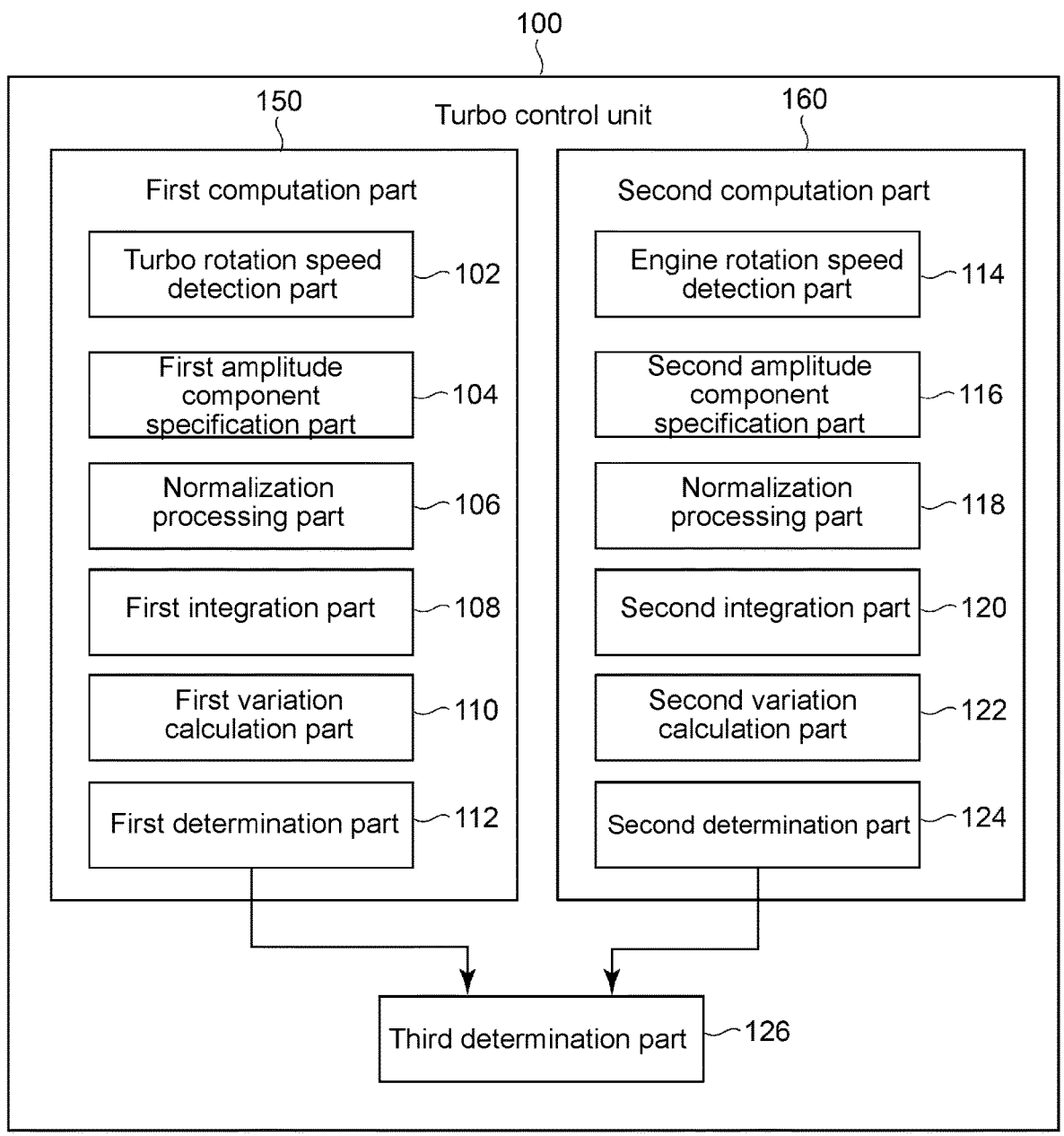
FIG. 8 is a modified example of FIG. 2.

Next, a modified example of the above-described embodiments will be described. FIG. 8 is a modified example of FIG. 2. In FIG. 8, the turbo control unit 100 includes, in addition to a first computation part 150 including the turbo rotation speed detection part 102, the first vibration component specification part 104, the normalization processing part 106, the first integration part 108, the first variation calculation part 110, and the first determination part 112 described above, a second computation part 160 including an engine rotation speed detection part 114, a second vibration component specification part 116, a normalization processing part 118, a second integration part 120, a second variation calculation part 122, and a second determination part 124.

As described above with reference to FIGS. 1 to 7, the first computation part 150 performs abnormality determination based on the variation of the combustion states among the cylinders on the basis of the temporal change of the turbo rotation speed Nt of the turbocharger 20. Compared to the first computation part 150, the second computation part 160 calculates the variation of the combustion states among the cylinders on the basis of the temporal change of the engine rotation speed Ne in place of the temporal change of the turbo rotation speed Nt of the turbocharger 20, and performs the abnormality determination using the calculation result. That is, the second computation part 160 is different from the first computation part 150 in using the temporal change of the engine rotation speed Ne but as for the rest, the second computation part 160 performs the same control as the first computation part 150, thereby calculating the variation of the combustion states among the cylinders based on the engine rotation speed Ne and performs abnormality determination based on the variation.

Moreover, in FIG. 8, the turbo control unit 100 also includes a third determination part 126 for determining the operating state of the engine 1 based on the determination result by the first determination part 112 of the first computation part 150 and the determination result by the second determination part 124 of the second computation part 160. Since the first determination part 112 determines the variation on the basis of the temporal change of the turbo rotation speed Nt, a variation of the exhaust energy in the respective cylinders is evaluated. Since the second determination part 124 determines the variation on the basis of the temporal change of the engine rotation speed Ne, a variation of the combustion energy in the respective cylinders is evaluated. Thus, combining these determination results, the third determination part 126 can determine the operating state of the engine 1 more specifically.

FIG. 9 is a table showing a determination example by the third determination part 126 of FIG. 8. As described above, the third determination part 126 determines the operating state of the engine 1 by combining the determination result of the first determination part 112 and the determination result of the second determination part 124. In FIG. 9, the operating state of each cylinder is classified into one of four types of states depending on the combination of the magnitude of the exhaust energy evaluated based on the determination result of the first determination part 112 and the magnitude of the combustion energy evaluated based on the determination result of the second determination part 124. State 1 indicates that the exhaust energy and the combustion energy are both large, and thus the fuel injection amount in the cylinder is large relative to the other cylinders. State 2 indicates that the exhaust energy is large and the combustion energy is small, and thus combustion efficiency of the cylinder is poor. State 3 indicates that the exhaust energy is small and the combustion energy is large, and thus combustion efficiency of the cylinder is good. State 4 indicates that the exhaust energy and the combustion energy are both small, and thus the fuel injection amount in the cylinder is small relative to the other cylinders.

Thus classifying each cylinder into one of Classifications 1 to 4 based on the determination result of the first determination part 112 and the determination result of the second determination part 124, the third determination part 126 can perform detailed analysis on the combustion state of each cylinder and perform failure detection. Alternatively, the turbo control unit 100 may reduce the variation among the cylinders of the engine 1 and improve the operation state by giving a command to the engine control unit 200 based on the determination result of the third determination part 126 to perform correction instruction of engine control parameters such as the fuel injection amount and the fuel injection timing.

As described above, according to at least one embodiment of the present invention, it is possible to provide the operating state determination device for the engine capable of properly determining the operating state of the engine by accurately evaluating the variation among the cylinders, the vehicle, and the operating state determination method for the engine.

INDUSTRIAL APPLICABILITY

At least one embodiment of the present invention is available for an operating state determination device for an engine mounted with a turbocharger and including a plurality of cylinders, a vehicle including the operating state determination device, and an operating state determination method for the engine.

REFERENCE SIGNS LIST

1 Engine
2 Engine body
4 Cylinder
6 Piston
8 Combustion chamber
10 Common rail system
12 High-pressure pump
13 Common rail
14 Injector
20 Turbocharger
20C Compressor
20S Rotational shaft
20T Turbine
22 Intake passage
24 Exhaust passage
26 Intake port
28 Air cleaner
30 Inter cooler
32 Throttle valve
34 Exhaust port
36 Boost pressure sensor
37 Inlet pressure sensor
38 Intake amount sensor
40 Crank angle sensor
42 Turbo rotation speed sensor
44 Engine rotation speed sensor
100 Turbo control unit
102 Turbo rotation speed detection part
104 First vibration component specification part
106 Normalization processing part
108 First integration part
110 First variation calculation part
112 First determination part
200 Engine control unit

The invention claimed is:

1. An operating state determination device for an engine mounted with a turbocharger and including a plurality of cylinders, the device comprising: a turbo rotation speed sensor detecting a temporal change of a turbo rotation speed of the turbocharger, for each cycle of the engine; and a processor and a storage medium storing program that causes the processor to: specify a first vibration component which is a waveform corresponding to each of the cylinders from the temporal change of the turbo rotation speed in one cycle of the engine; first integrate a frequency of an amplitude of the first vibration components for each of the cylinders over a plurality of cycles of the engine; and calculate a variation of combustion states in the plurality of cylinders by comparing integration results of the first integrating step among the cylinders, wherein the specifying step specifies the first vibration component based on a temporally increasing region of the temporal change, and wherein the program further causes the processor to: determine presence or absence of an abnormality in the engine based on the calculation result of the calculate step.

2. The operating state determination device for the engine according to claim 1,
wherein the region is an amplitude difference between a minimum value and a maximum value of the temporal change, the maximum value immediately succeeding the minimum value.

3. The operating state determination device for the engine according to claim 1,
wherein the first integrate step integrates the first vibration components on which a normalization process regarding an operating state of the engine is performed.

4. The operating state determination device for the engine according to claim 1,
wherein, if the temporal change has an amplitude of not greater than a predetermined value, a process is prohibited.

5. The operating state determination device for the engine according to claim 1,
wherein the specify step associates the first vibration component included in the temporal change of the turbo rotation speed with each of the cylinders, based on a reference signal synchronized with a rotation state of a crank shaft.

6. The operating state determination device for the engine according to claim 1,
wherein calculate step calculates, as the variation, a variance value regarding the integration results of the first vibration components corresponding to the respective cylinders, and
wherein the determine step determines that the engine has the abnormality, if the variance value is not less than a first threshold.

7. The operating state determination device for the engine according to claim 1,
wherein the calculate step calculates, as the variation, a variation of the integration results of the first vibration components corresponding to the respective cylinders and an average value of the integration results, and
wherein the determine step determines that there is the abnormality in the cylinders having the difference of not less than a second threshold.

8. The operating state determination device for the engine according to claim 1,
wherein, if the correction control is performed not less than a predetermined number of times, the program causes the processor to determine that the engine has the abnormality, regardless of the calculation result of the first variation calculation part.

9. The operating state determination device for the engine according to claim 1, wherein the program further causes the processor to: detect a temporal change of an engine rotation speed of the engine, for each cycle of the engine; specify a second vibration component which is a waveform corresponding to each of the cylinders from the temporal change of the engine rotation speed in one cycle of the engine; second integrate the second vibration components for each of the cylinders over the plurality of cycles of the engine; second calculate a variation of combustion states in the plurality of cylinders by comparing integration results of the integrate step among the cylinders; and third determine an operating state of the engine based on a calculation result of the first calculate step and a calculation result of the second calculate step.

10. A vehicle, comprising:
the operating state determination device according to claim 1; and
a vehicle controller controlling the engine based on a determination result of the operating state determination device.

11. The operating state determination device for the engine according to claim 1, wherein
the program further causes the processor to:
specify a rank of the first vibration component for each of the cylinders included in the temporal change of the turbo rotation speed, for each cycle of the engine,
wherein the first integrate step integrates values of the ranks for each of the cylinders over the plurality of cycles of the engine.

12. The operating state determination device for the engine according to claim 11,
wherein an average value of the ranks for each of the cylinders is calculated, and based on whether the average value of each of the cylinders falls within a predetermined range, presence or absence of an abnormality in the engine is determined.

13. An operating state determination device for an engine mounted with a turbocharger and including a plurality of cylinders, the device comprising: a turbo rotation speed sensor detecting a temporal change of a turbo rotation speed of the turbocharger, for each cycle of the engine; and a processor and a storage medium storing program that causes the processor to: specify a first vibration component which is a waveform corresponding to each of the cylinders from the temporal change of the turbo rotation speed in one cycle of the engine; first integrate the first vibration components for each of the cylinders over a plurality of cycles of the engine; calculate a variation of combustion states in the plurality of cylinders by comparing integration results of the first integrate step among the cylinders; and specify a rank of the first vibration component for each of the cylinders included in the temporal change of the turbo rotation speed, for each cycle of the engine, wherein the first integrate step integrates a frequency of the ranks for each of the cylinders over the plurality of cycles of the engine.

14. An operating state determination method for an engine mounted with a turbocharger and including a plurality of cylinders, the method comprising: a step of detecting a temporal change of a turbo rotation speed of the turbocharger, for each cycle of the engine; a step of specifying a first vibration component which is a waveform corresponding to each of the cylinders from the temporal change of the turbo rotation speed in one cycle of the engine; a step of integrating a frequency of an amplitude of the first vibration components for each of the cylinders over a plurality of cycles of the engine; a step of calculating a variation of combustion states in the plurality of cylinders by comparing integration results of the first vibration components among the cylinders; and a step of determining presence or absence of an abnormality in the engine based on the calculation result of the calculate step, wherein the step of specifying the first vibration component includes specifying the first vibration component based on a temporally increasing region of the temporal change of the turbo rotation speed.

15. The operating state determination method for the engine according to claim 14,
  wherein the region is an amplitude difference between a minimum value and a maximum value of the temporal change, the maximum value immediately succeeding the minimum value.

* * * * *